Dec. 15, 1964    A. LIEB    3,161,800
INDICATOR TUBE HAVING TWO INDICATION SYSTEMS
Filed April 6, 1961    4 Sheets-Sheet 1

INVENTOR
A. LIEB

BY

ATTORNEY

Dec. 15, 1964                A. LIEB                 3,161,800
            INDICATOR TUBE HAVING TWO INDICATION SYSTEMS
Filed April 6, 1961                              4 Sheets-Sheet 2
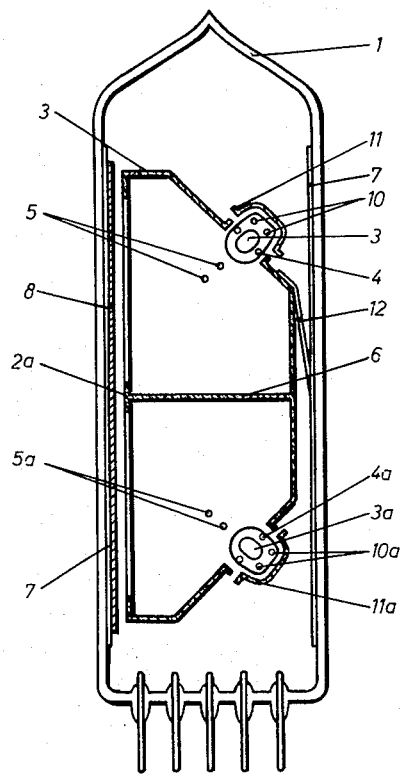
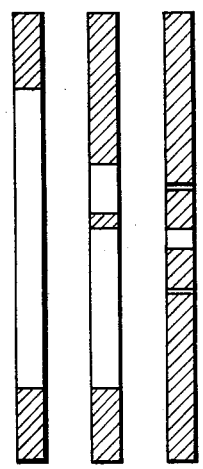
INVENTOR
A. LIEB
BY
ATTORNEY

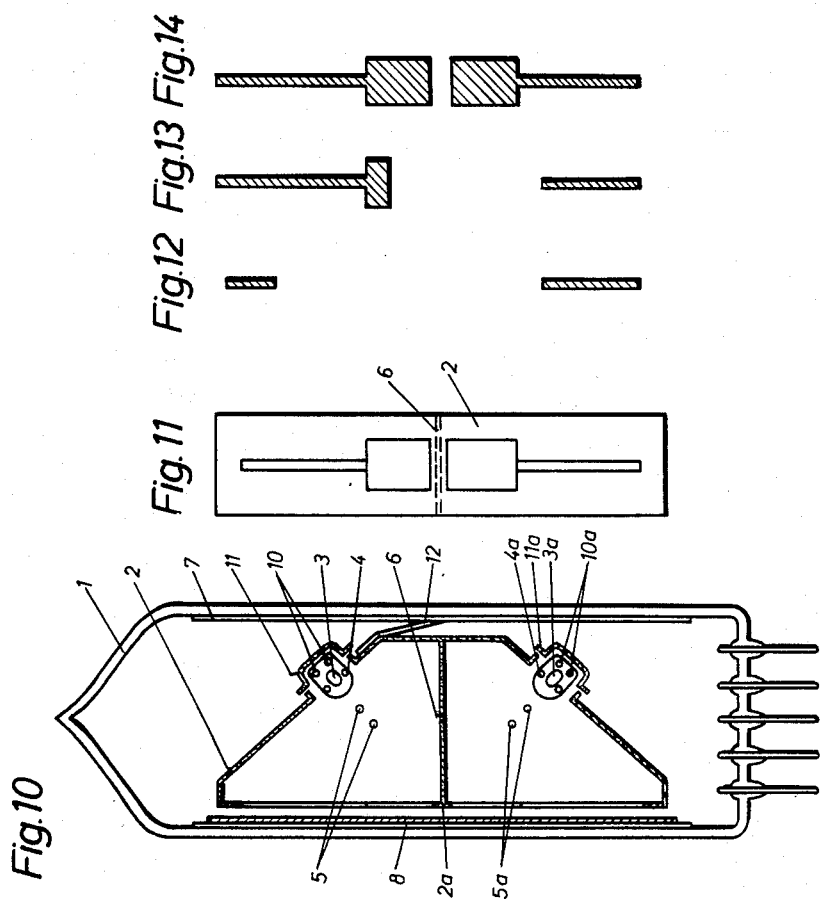

Dec. 15, 1964 A. LIEB 3,161,800
INDICATOR TUBE HAVING TWO INDICATION SYSTEMS
Filed April 6, 1961 4 Sheets-Sheet 4

INVENTOR
A. LIEB

BY *R P Morris*

ATTORNEY

United States Patent Office 3,161,800
Patented Dec. 15, 1964

3,161,800
INDICATOR TUBE HAVING TWO INDICATION
SYSTEMS
Albert Lieb, Bad Cannstatt, Stuttgart, Germany, assignor to International Standard Electric Corporation, New York, N.Y., a corporation of Delaware
Filed Apr. 6, 1961, Ser. No. 101,296
Claims priority, application Germany Apr. 16, 1960
14 Claims. (Cl. 315—13)

The invention relates to indicator tubes and more particularly to an indicator tube, having at least two indication systems, which simultaneously monitors and/or compares two voltages.

An object of the present invention is to provide an improved indicator tube, for use, for example, as a volume indicator for stereophonic tape recorders, stereophonic radio sets, or to indicate the tuning condition of receivers for frequency modulation.

According to the invention, two voltages may be simultaneously indicated by means of an indicator tube having two indication systems each consisting of at least one cathode and deflection electrode. A common fluorescent screen is provided on which two electron beams produced by each deflection electrode are directed. A partition wall separates the indication systems such that each time one of the electron beams of the two produced by the deflection electrode of each indication system does not appear on the screen, at least at low voltages, the two adjacent electron beams of both indication systems fall on the partition.

The present invention is explained with reference to the drawings in which:

FIG. 6 is a cross-sectional view of another embodiment of an indicator tube following the principles of the present invention;

FIGS. 7 through 9 illustrate typical displays which may be produced by the tube shown in FIG. 6;

FIGS. 10 and 11 are a cross-sectional view of still another embodiment of an indicator tube following the principles of the present invention;

FIGS. 12 through 14 illustrate typical displays which may be produced by the tube shown in FIGS. 10 and 11;

Figure 1:
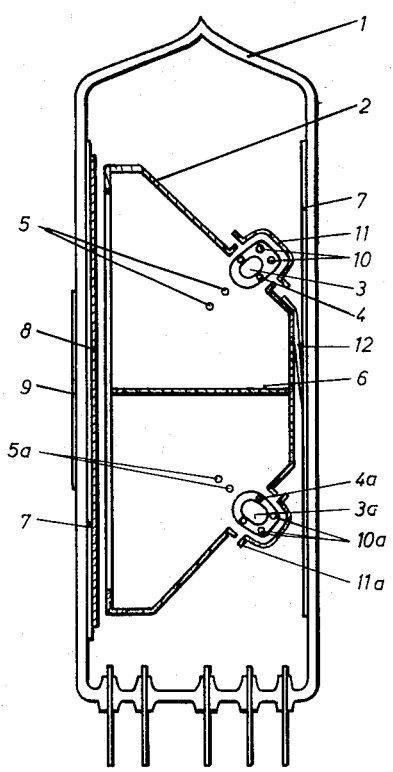
FIG. 1 is a cross-sectional view of a preferred embodiment of an indicator tube following the principles of the present invention.

Referring to FIG. 1, a support structure 2 is shown housed in an envelope 1 and containing two indication systems consisting of cathodes 3 and 3a, grids 4 and 4a and deflection electrodes 5 and 5a. The deflection electrodes may be round struts or pieces of sheet metal. As FIG. 1 shows, the embodiment has two pairs of electrically connected struts 5 and 5a as deflection electrodes in order to increase deflection sensitivity. Both indication systems are arranged in envelope 1 along the tube's axis, one over the other. Between the two systems there is a piece of sheet metal 6 that serves as a partition. The partition may be connected to support structure 2 or may be an integral part thereof. The electrically conductive and optically penetrable layer 7 applied to envelope 1 and a fluorescent layer 8 is applied over it to form a fluorescent screen. Layer 7 may be, for example, a tin oxide layer that is produced in known manner by the decomposition of tin tetrachloride or of tin dichloride or by the reaction of these chemicals with the heated glass tube wall. Fluorescent layer 8 consists, for example, of a layer of zinc silicate or zinc oxide. The layer can, for example, be sprayed on in known manner. The planes containing deflection electrodes 5 and 5a, respectively, and the axes of cathodes 3 and 3a, respectively, cross in the partition 6 or in the plane containing the partition in the partition's immediate vicinity. The planes also cross fluorescent screen 8 at a less than 90° angle, both these angles preferably being the same. Furthermore, a substantially perpendicular arrangement of partition 6 with respect to the screen 8 is preferred. Each indication system, through the operation of the deflection electrodes, produces two electron beams. The deflection angle of the beams can be changed by means of the voltage applied to deflection electrodes 5 and 5a. The angle of tilt of each cathode axis and each deflection electrode's planes with respect to the fluorescent screen 8 and to the partition 6 and the size of the partition 6 are so chosen that in each case the adjacent ones of the electron beams produced by both systems fall on the partition 6 and thus do not reach the screen 8. Support structure 2 has rectangular apertures on the side facing the screen. Each system thus produces a rectangular luminescent strip on the screen 8 by means of the non-adjacent ones of the electron beams. The length of the strip can be changed by means of the voltage applied to the deflection electrode 5 or 5a. The edges of each of the rectangular strips which are closest together approach one another when the voltage is increased. In the embodiment of FIG. 1 the two movable luminescent edges converge at the highest voltage that can be indicated. In order to increase indicator sensitivity, the indicator voltages are amplified by means of an amplifier system consisting of control electrodes 10 and 10a, respectively, anodes 11 and 11a, respectively, and part of cathodes 3 and 3a, respectively. The size of the voltage between the cathode and the control electrodes affects the discharge current between cathode and anode. The paired amplifier and indication systems are each arranged in radial sections around a cathode and face each other. When the tube is in operation, anodes 11 and 11a, respectively, are connected to deflection electrodes 5 and 5a respectively. A voltage, positive with respect to the cathode and preferably the fluorescent screen voltage, is applied to the deflection electrodes 5, 5a or anodes 11, 11a across an external resistance (not shown). The indicator voltages are connected to cathodes 3 and 3a, respectively, and to grids 4 and 4a, respectively. The fluorescent screen voltage is applied to support structure 2. A contact spring 12 provides the electrical connection to conductive layer 7 and thereby to fluorescent screen 8. A color filter 9 is placed in front of part of the screen. In the preferred embodiment filter 9 is located on the outside of the tube. Filter 9 is so chosen that it lets only a portion of the light produced by fluorescent screen 8 through. The emission color of screen 8 and the penetrability of filter 9 are preferably so chosen that the differences in color between the filtered and unfiltered portion of the fluorescent screen light are as great as possible. Provision is made, for example, to use zinc oxide as fluorescent material and a yellow filter in front of part of the screen, for example, a strip of yellow plastic or a layer of yellow varnish. Complementary colors are held to be the most advantageous. Great differences in color can be particularly brought about if the luminescent material, zinc oxide for example, emits as broad an optical color-spectrum range as possible. With increasing indicator voltage, the color of the expanding luminescent strip changes for the observer from a certain indicator voltage onward. In accordance with the invention, this is used to mark a certain pre-supposed voltage value. For example, it can be used to indicate the overload in either of the two tape channels of a stereophonic tape recorder.

Figures 2, 3, 4, 5:
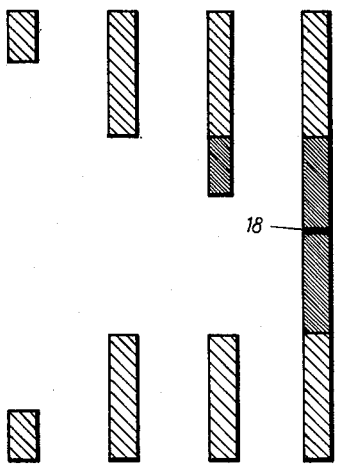
FIGS. 2 through 5 illustrate typical displays which may be produced by the tube shown in FIG. 1.

FIG. 2 shows the fluorescent image produced by low indicator voltages. The coarse shading is meant to represent a certain color. With increasing indicator voltage, as FIG. 3 shows, the luminescent strip increases in length. FIG. 4 shows the luminescent strip for the case where the indicator voltage applied to the upper indicator system is raised still higher. From a certain pre-supposed voltage value onward, the color of the further expanding luminescent strip changes, from blue or blue green to yellow, for example. The other color is indicated in the figure by means of finer shading lines. FIG. 5 shows a luminescent image that results from applying a relatively high indicator voltage to both indicator systems. At the point of the luminescent image marked 18, the screen is being illuminated by both indicator systems, resulting in a zone of increased luminous density. In accordance with the invention this is used to indicate a high indicator voltage in both indicator systems. A plurality of different color filters may be used to indicate a plurality of pre-supposed voltage values.

An alternative method of filter arrangement may be provided by arranging color filters in front of that portion of the screen not covered by filter 9. This makes it easier to meet the requirement of the greatest possible color difference. Also, different filters may be arranged in front of the luminescent strips produced by each of the individual systems. Thus, the luminous samples produced by the individual systems, aside from their different location, may also be distinctly indicated by a different color. Any exceeding of certain voltage values in the individual systems can also be indicated by means of different filters that yield correspondingly different colors. A change in the luminescent strip's color from a certain indicator value onward can also be brought about by applying luminescent materials with different emission color on the luminescent screen along the luminescent strip's change in length. By using a zinc silicate and a properly activated aluminum oxide luminescent material, a color change can be made to occur, for example, from green to red.

Another embodiment of the invention is shown in FIG. 6. In FIG. 6 the same reference marks as in FIG. 1 have been used to designate the same parts.

The embodiment of FIG. 6 differs from the one shown in FIG. 1 in that the inclination of the planes through cathodes 3 and 3a, respectively, and deflection electrodes 5 and 5a, respectively, with respect to partition 6 or to the plane in which the partition is located, is smaller and in that there is located in front of partition 6 a piece of sheet metal 2a that captures a portion of the electron beams produced by the indicator systems. Sheet-metal piece 2a may also be regarded as an extension of partition 6 and in this embodiment it is intended to prevent parts of the luminescent screen from being illuminated by both indicator systems at the same time. In this embodiment the sheet-metal piece 2a has boundary lines that are parallel to the cathodes or to the deflection electrodes. The embodiment shown in FIG. 6 may be used in particular applications where special indicator effects are desired. The planes through cathodes 3 and 3a, respectively, and through deflection electrodes 5 and 5a, respectively, do not cross in the immediate vicinity of the partition 6. Rather, the plane in which the partition 6 is located is crossed farther on outside the tube. The plane's angle of inclination is so chosen that with a presupposed value of the indicator voltage the adjacent ones of the electron beams produced by the indicator systems reach the luminescent screen 8. This causes an additional luminescent strip to appear on the screen 8. The invention utilizes this additional strip to indicate a given voltage value. FIGS. 7, 8 and 9 show the luminescent images achieved with the tube of FIG. 6 at various indicator voltages. FIG. 7 shows the luminescent image at low voltages applied to deflection electrodes 5 and 5a, respectively. In the image shown in FIG. 8, the voltage of the upper deflection system has been increased. Whereas originally there were only two luminescent strips, one or two more strips that grow with increasing voltage now appear between the luminescent strips from a certain voltage value onward. According to its assignment to the other indicator system, the additional luminescent strip is closer to the upper luminescent strip than to the lower one. FIG. 9 shows the luminescent image when both indicator systems are at a relatively high voltage. From the figure it can be seen that the two luminescent strips produced by each indicator system are converging.

In the further embodiment of FIGS. 10 to 14, the same references are used to indicate the same parts as in the previous figures.

FIG. 10 shows a cross-section of a further embodiment of an indicator tube, wherein the same reference numbers are used to denote the same parts as in the previous figures.

The inclination of the planes through cathodes 3 and 3a, respectively, and deflection electrodes 5 and 5a, respectively, of both indicator systems are the same as in the embodiment of FIG. 1. However, just as in the embodiment of FIG. 6, a sheet-metal piece 2a is arranged in front of partition 6. In contrast to the previous embodiments, the apertures in support structure 2 that face the screen are of different width, as shown in FIG. 11. At low indicator voltages there thus results in both systems a relatively narrow luminescent strip. This strip becomes larger abruptly when a given voltage is exceeded as demonstrated in FIGS. 12, 13 and 14. The invention uses this to indicate a given indicator value, the overloading of a stereophonic tape recorder, for example.

FIG. 12 shows the luminescent image at low but differing indicator voltages. In FIG. 13 the luminescent strip is shown for the case where the voltage of the upper deflection system has exceeded the given indicator voltage. With the luminescent strip shown in FIG. 14 the indicator voltage in both systems is considerably above the voltage value to be marked.

Figure 15:
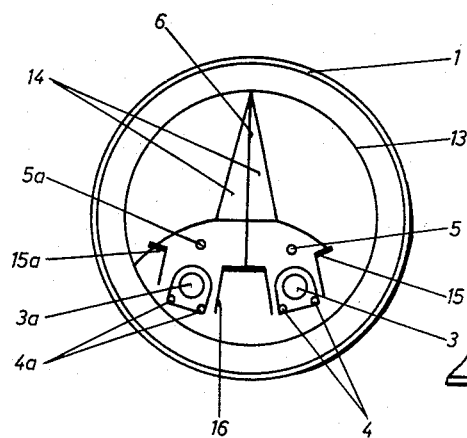
FIGS. 15 and 16 are respectively top and cross-sectional views of still another embodiment of an indicator tube following the principles of the present invention.
Figure 16:
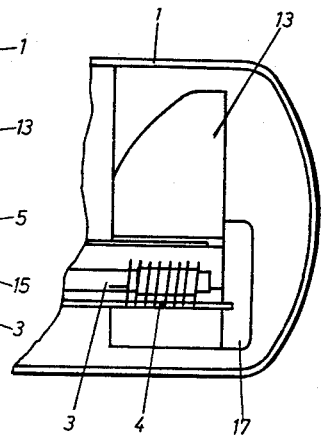
Figure 17:
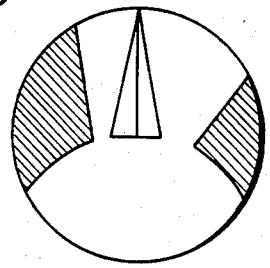
FIGS. 17 and 18 illustrate typical displays which may be produced by the tube shown in FIGS. 15 and 16.
Figure 18:
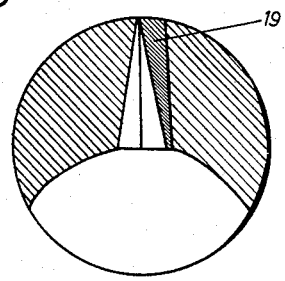

FIGS. 15 and 16 show still another modified embodiment of the present invention. FIG. 15 is a top view and FIG. 16 a cross-section of the schematic of an indicator tube. FIGS. 17 and 18 show luminescent images of this embodiment. The same references have been used for the same parts as in the previous figures. A bowl-shaped sheet-metal part 13 serves as the luminescent screen, the inside of which is covered with luminescent material. Cathodes 3 and 3a respectively, are arranged parallel to the axis of envelope 1. Both indicator systems are formed by cathodes 3 and 3a, respectively, grids 4 and 4a, respectively, deflection electrodes 5 and 5a, respectively, and sheet-metal parts 15, 15a and 16, respectively, which are in an angular arrangement and are at luminescent screen potential. The angle parts 15, 15a and 16 are intended to increase deflection sensitivity. In the previous embodiments these sheet-metal parts, as may be seen in FIGS. 1, 6 and 10, formed an integral part with support structure 2. There is a partition 6 between the two indicator systems, which is at positive potential, preferably at screen potential. The partition is preferably connected to or forms an integral part of the luminescent screen. The luminescent screen has a triangular notch, marked 14 in the figure, and it is not capable of luminescence at that point. The plane through cathodes 3 and 3a, respectively, and deflection electrodes 5 and 5a respectively, hits the partition about at its extreme point of connection to the luminescent screen. By means of the arrangement of partition 6, the adjacent electron beams produced by both indicator systems do not reach the screen at low indicator voltages. In order not to disturb the viewing of the screen with the light of the cathode and of the heating element, there is a standard shielding cap 17 above the indicator system. It is preferably at screen potential.

As was the case with the previously described embodiments, the voltage to be indicated can be preamplified by means of amplifier systems in order to increase indicator sensitivity. The two amplifier systems required for that purpose may be arranged one over the other around the lower portion of envelope 1. Furthermore, a radial arrangement of the systems around the envelope is also provided for.

At relatively low voltages applied to the deflection electrodes, depending on the size of that voltage, a more or less large sector-type luminescent image results. FIG. 17 shows such an image.

The voltages applied to the deflection electrodes differ. If the voltage is increased, there is complete illumination of the screen portion belonging to the respective portion. If the voltage is increased still further, another luminous sector 19 of high luminous density forms. This is due to the fact that the electron beams that heretofore were striking the partition are in addition illuminating the luminous screen. Both luminous sectors are now overlapping on the luminous screen. It is intended to utilize this overlapping to indicate a given voltage value. FIG. 18 shows the luminous image for the case where in the right-hand indicator system the indicator voltage is increased beyond the given voltage value. The luminous sector of increased luminous density is indicated by the increase in shading.

The principle of the overlapping of the electron beams in order to indicate a radiation image can also find use, of course, just as in the examples shown in FIGS. 1 to 14. The inclination of the planes with respect to the partition is so chosen that the planes intersect support structure 2 just about at the point of connection of partition and support structure.

The particular advantage of an indicator tube as described hereinabove is that such a device is simple to produce and the simultaneous reading of the two indicator voltages and their comparison are clear and easily accomplished. Comparison is particularly accurate if the arrangement is preferably such that with low indication voltages the electron beams that do not strike the partition come as close together as possible on the fluorescent screen. The two movable edges of each indication system are preferably adjacent. When the voltage changes, the edges approach each other or separate from each other.

In particular, the arrangement can be such that the edges collide in the case of high indication voltages. With the principle described, it is possible in simple fashion to distinguish certain values of the indication voltage, for example the voltage value that corresponds to the overloading of a stereophonic tape recorder.

It may also be useful to combine the inventive measures shown in the separate examples so as to indicate a given voltage value. For example, in the embodiment of FIG. 6 a color filter can be placed in front of that portion of the luminous screen that produces the additional luminous strips. Furthermore, the luminous screen on this portion may be of the same or a different width.

While I have described above the principles of my invention in connection with specific apparatus, it is to be clearly understood that this description is made only by way of example and not as a limitation to the scope of my invention as set forth in the objects thereof and in the accompanying claims.

I claim:

1. An indicator tube comprising an envelope having mounted therein two image producing systems including a common image display screen, first cathode means associated with one of said image producing systems for producing a first and second electron beam, second cathode means associated with the other of said image producing systems for producing a third and fourth electron beam, means for deflecting said first and second beams, means for deflecting said third and fourth beams, and a partition member mounted in relation to said screen and cathodes such that said first and fourth beams are deflected onto said screen from opposite sides of said partition forming two spaced patterns on respective portions of said screen remote from said partition and said second and third electron beams are deflected onto opposite sides of said partition member for deflection voltages below a given value.

2. An indicator tube according to claim 1 wherein said display screen includes a coating of fluorescent material.

3. An indicator tube according to claim 1 wherein a color filter is mounted proximate to said display screen to impart a color to the patterns thereon.

4. An indicator tube according to claim 1 wherein changes in said deflection voltages cause predetermined changes in the form of said patterns.

5. An indicator tube according to claim 1 wherein the plane containing said means for producing and said means for deflecting said first and second beams and the plane containing said means for producing and said means for deflecting said third and fourth beams intersect each other in the plane containing said partition member.

6. An indicator tube according to claim 1 wherein said partition member is mounted substantially perpendicular to said display screen.

7. An indicator tube according to claim 1 wherein an apertured masking plate is mounted intermediate said beam producing means and said display screen for producing displays on said screen which conforms with said aperture shape.

8. An indicator tube according to claim 1 including amplifier means associated with each said cathode, said cathodes forming portions of said amplifiers.

9. An indicator tube according to claim 1 wherein a first color filter is mounted proximate to said display screen at the area where one of said two patterns are displayed and a second color filter is mounted proximate to said screen at the area where the other one of said two patterns are displayed such that said two patterns appear in different colors.

10. An indicator tube according to claim 9 wherein the plane containing said means for producing, and said means for deflecting said first and second beams and the plane containing said means for producing and said means for deflecting said third and fourth beams intersect the plane containing said partition member at the same angle.

11. An indicator tube according to claim 1 wherein variations in said deflection voltages cause said patterns on said screen to move relative to each other.

12. An indicator tube according to claim 3, wherein an increase in deflection voltage causes said patterns to move toward each other.

13. An indicator tube according to claim 1 wherein said second and third electron beams are deflected onto said screen on opposite sides of said partition and adjacent thereto for deflection voltages above a given value, thereby producing a different pattern on said screen.

14. An indicator tube according to claim 13, wherein said second and third beams deflected onto said screen overlap said patterns of said first and fourth beams.

References Cited in the file of this patent
UNITED STATES PATENTS

| | | |
|---|---|---|
| 2,513,908 | Baily | July 4, 1950 |
| 2,712,612 | Lieb | July 5, 1955 |
| 2,805,352 | Bitter et al. | Sept. 3, 1957 |
| 2,927,237 | Lieb | Mar. 1, 1960 |

FOREIGN PATENTS

| | | |
|---|---|---|
| 829,553 | Great Britain | June 29, 1960 |
| 838,078 | Great Britain | June 22, 1960 |
| 909,008 | Germany | Apr. 12, 1954 |
| 1,038,201 | Germany | Sept. 4, 1958 |
| 156,517 | Australia | May 17, 1954 |

OTHER REFERENCES

R.C.A. Application Note No. 94, June 22, 1938.